United States Patent Office 2,694,731
Patented Nov. 16, 1954

2,694,731

PHENOLIC ETHER DIALDEHYDES

Louis H. Bock and Lewis J. Carlson, Shelton, Wash., assignors to Rayonier Incorporated, Shelton, Wash., a corporation of Delaware No Drawing. Original application April 24, 1951, Serial No. 222,734, now Patent No. 2,649,436, dated August 18, 1953. Divided and this application May 7, 1953, Serial No. 353,671

2 Claims. (Cl. 260—600)

This invention relates to organic compounds and resinous products and has for its object the provision of a new class of dialdehydes and an efficient and economically advantageous method of producing the dialdehydes.

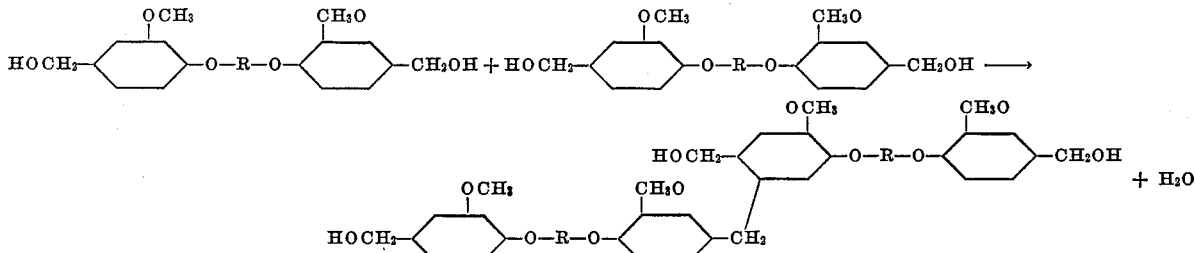

While the dialdehydes of the invention have general utility, they are advantageously useful for the preparation of thermosetting resins as described and claimed in application Serial No. 222,734, filed April 24, 1951, now Patent No. 2,649,436, of which this application is a division.

The so-called thermosetting resins are characterized by a cross-linked or lattice structure and have the property of being infusible and insoluble in all solvents except those that decompose them. While the thermosetting resins heretofore produced are variously colored or opaque, the molded resins of the invention are colorless and clear.

The dialdehydes of the invention are represented by the following structure:

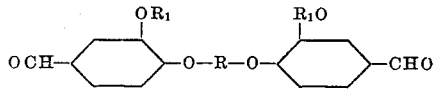

In the above formulae, the R-group represents a divalent aliphatic chain of 2–4 carbon atoms which may be interrupted by an oxygen-ether group and $R_1$ represents methyl or ethyl. Examples of R include the following:

—CH₂—CH₂—
—CH₂—CH₂—CH₂—
—CH₂—CH₂—CH₂—CH₂—
—CH₂—CH₂—O—CH₂—CH₂—

One important aspect of the invention is that the starting materials for the dialdehydes may be vanillin which is potentially available in great abundance by the alkaline oxidation of sulfite waste liquor, a by-product in the manufacture of cellulose from wood.

Specific dialdehydes may be prepared from vanillin in the reaction which follows.

(1)

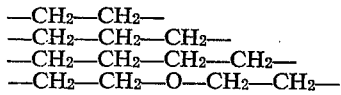

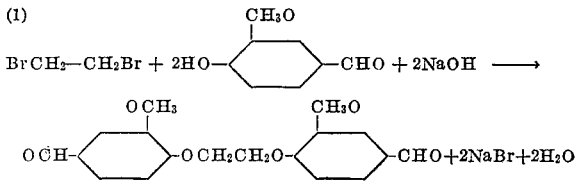

(2)

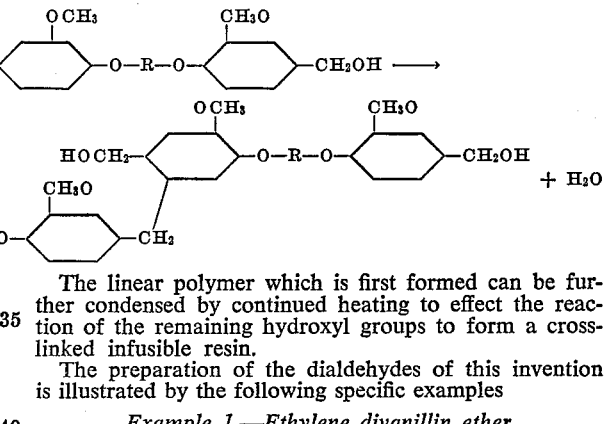

Reaction 1 results in the formation of the dialdehyde ethylene divanillin ether which is an important intermediate in the formation of dihydric alcohol.

Reaction 2 results in the formation of the dihydric alcohol which, on condensation, forms the resins of the said application.

The dihydric alcohols of Reaction 2 condense intermolecularly when heated to form a polymer by splitting out water between the hydroxyl groups and nuclear hydrogen atoms of an adjacent molecule, as illustrated in the following reaction

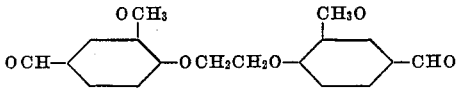

The linear polymer which is first formed can be further condensed by continued heating to effect the reaction of the remaining hydroxyl groups to form a cross-linked infusible resin.

The preparation of the dialdehydes of this invention is illustrated by the following specific examples

*Example 1.—Ethylene divanillin ether*

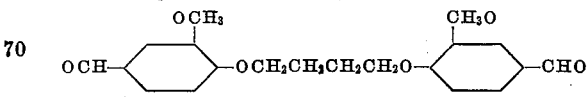

A mixture of 76 parts of vanillin, 21.2 parts of sodium hydroxide, 450 parts of water, and 47 parts of ethylene dibromide was placed in a reaction vessel equipped with a mechanical stirring device and a reflux condenser. The mixture was heated to refluxing and stirred continuously for 21 hours. At the end of this time a tan-colored granular solid had separated from the reaction mixture. This product when dried had a melting point of 180°–184° C. The yield was 67.9 parts. It could be crystallized from the monomethyl ether of ethylene glycol to give colorless needles with no change in melting point. The product was ethylene divanillin ether.

*Example 2.—Ethylene divanillin ether*

A mixture of 76 parts of vanillin, 21.2 parts of sodium hydroxide, 450 parts of water, and 30 parts ethylene dichloride was placed in an autoclave equipped with a mechanical stirrer. The mixture was heated to 120°–130° C. and stirred continuously for 4 hours. The gauge pressure was 70 pounds at the start and fell to 50 pounds at the end. A product similar to that of Example 1 was obtained in a yield of 46 parts.

*Example 3.—Tetramethylene divanillin ether*

OCH—⟨ ⟩—OCH₂CH₂CH₂CH₂O—⟨ ⟩—CHO
   |                                  |
   OCH₃                             CH₃O

A mixture of 76 parts of vanillin, 20 parts of sodium hydroxide, 500 parts of water, and 31.8 parts of 1,4-dichlorobutane was placed in an autoclave and stirred 7 hours at a temperature of 130°–140° C. The maximum gauge pressure was 40 pounds. A solid product was obtained which was recrystallized from 300 parts of ethylene glycol monomethyl ether. Forty parts of a crystalline product melting at 155°–160° C. was obtained. The product was tetramethylene divanillin ether.

*Example 4.—Diethylene glycol divanillin ether*

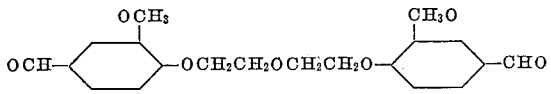

A mixture of 76 parts of vanillin, 20 parts of sodium hydroxide, 450 parts of water, and 38 parts of β,β'-dichlorodiethyl ether was placed in a reaction vessel equipped with mechanical stirrer and stirred 18 hours at 99° C. A crystalline product separated on cooling the reaction mixture. The product was crystallized from 250 parts of an equal mixture of ethyl alcohol and water. Twenty-five parts of crystalline product was obtained with a melting point of 115°–125° C. The product was diethylene glycol divanillin ether.

*Example 5.—Ethylene-bis-(2-methoxy-4-hydroxymethylphenyl) ether*

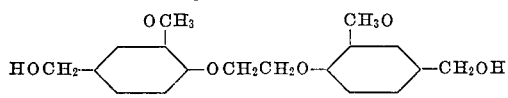

A mixture of 35 parts of ethylene divanillin ether as prepared in Example 1, 403 parts of methyl isobutyl carbinol, and 15 parts of aluminum isopropoxide was placed in a distilling apparatus equipped with mechanical stirrer and a distilling column packed with glass helices and attached to a total reflux distilling head. The mixture was stirred and refluxed, and the distillate was bled off slowly. The vapor temperature was 81° C. at the start and 13.5 parts of distillate was obtained at a vapor temperature of 81°–90° C. This represents the isopropanol obtained from the aluminum isopropoxide. The vapor temperature then rose to 115° C. and 88 parts of distillate was obtained at a temperature of 115°–127° C. This fraction contained methyl isobutyl ketone obtained from the oxidation of methyl isobutyl carbinol. The total refluxing time was 7 hours. The reaction mixture was then placed in a steam distillation apparatus and subjected to steam distillation until all the methyl isobutyl carbinol had been removed. The insoluble residue was then crystallized from water to give 27 parts of colorless, crystalline needles having a melting point of 132°–135° C. This product was ethylene-bis-(2-methoxy-4-hydroxymethylphenyl) ether.

*Example 6.—Tetramethylene-bis-(2-methoxy-4-hydroxymethylphenyl) ether*

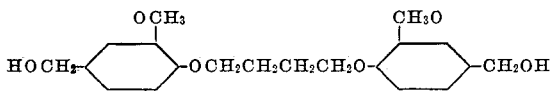

This compound was prepared by the procedure described in Example 5, using 32 parts of tetramethylene divanillin ether, 12.25 parts of aluminum isopropoxide and 262 parts of methyl isobutyl carbinol. After refluxing 15 hours, during which time methyl isobutyl ketone was removed by distillation, the reaction mixture was steam distilled to remove excess methyl isobutyl carbinol. The residue was dissolved in 4000 parts of boiling water. On cooling, 10 parts of crystals melting at 137°–139° C. was obtained. The product was tetramethylene-bis-(2-methoxy-4-hydroxymethylphenyl) ether.

*Example 7.—Bis-(2-methoxy-4-hydroxymethylphenoxyethyl) ether*

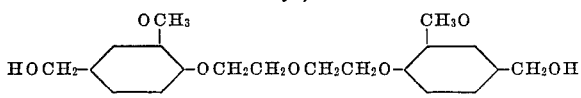

This compound was prepared by the procedure described in Example 5, using 12.8 parts of diethylene glycol divanillin ether, 5 parts of aluminum isopropoxide, and 250 parts of methyl isobutyl carbinol. The product was crystallized from water. The melting point was 98–102° C.

*Example 8.—Condensation of ethylene bis-(2-methoxy-4-hydroxymethylphenyl) ether*

Ethylene-bis-(2-methoxy-4-hydroxymethylphenyl) ether was heated 1 hour at a temperature of 175°–196° C. During the heating there was active boiling as water was split out during the condensation. The product was a low-melting, colorless, resinous solid. It was insoluble in most solvents but could be dissolved in dimethyl formamide.

*Example 9.—Coating steel*

A 25% solution of the product of Example 7 in dimethyl formamide and containing 1% oxalic acid was coated on a steel rod, dried in an oven at 110° C. and then baked for 1½ hours at 160°–170° C. Four successive coatings were applied in this manner. The film was transparent and had a light amber color. It was resistant to all organic solvents and withstood 6 hours boiling in 9% sulfuric acid.

*Example 10.—Condensation of ethylene-bis-(2-methoxy-4-hydroxymethylphenyl) ether to a molding compound*

Five parts of the product of Example 5 was dissolved in 380 parts of boiling water, and 3 parts of hydrochloric acid was added. The mixture was stirred at refluxing temperature for 2½ hours. The mixture became cloudy and an oil separated which gradually solidified. The product was removed by filtration. It was a thermoplastic mixture which softened at 50° C.

*Example 11.—Molding*

Three grams of the product described in Example 10 was placed in a cylindrical stainless steel mold having a cross-sectional area of 0.787 sq. in. The mold was heated to 200° C. over a period of 40 minutes, and a pressure of 8345 pounds per sq. in. was applied. The mold was allowed to cool under pressure. The product was a clear, almost colorless molded disk which would take a high polish and could be easily machined. It was insoluble in all organic solvents and resisted the action of mineral acids. It was completely infusible.

*Example 12.—Condensation of tetramethylene-bis-(2-methoxy-4-hydroxymethylphenyl) ether*

The product of Example 6 was heated 2 hours at 175°–250° C. The molten material boiled during the heating and became progressively more viscous. On cooling, a hard glassy resin remained. A small amount of this material was dissolved in dimethyl formamide and coated on a glass plate. It was dried in an oven at 115° C. and then heated for one hour at 130° C. The product did not melt below 300° C. and was resistant to 10% sulfuric acid at 100° C.

*Example 13.—Condensation of bis-(2-methoxy-4-hydroxymethylphenoxyethyl) ether*

The product of Example 7 was heated at 180°–220° C. for 3 hours. A hard glassy solid was obtained on cooling. The product was dissolved in dimethyl formamide and a trace of oxalic acid was added. The solution was coated on a glass plate and dried two hours at 120° C. followed by baking 30 minutes under an infra-red lamp. The resulting film was hard and resistant to 10% sulfuric acid at 100° C. It softened at 100° C. but did not melt below 300° C.

*Example 14.—Ethylene di-ethylvanillin ether*

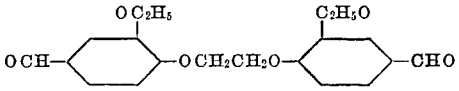

A mixture of 41.5 parts of ethylvanillin, 10 parts of sodium hydroxide, 250 parts of water, and 23.6 parts of ethylene dibromide was placed in a reaction vessel equipped with a mechanical stirring device and a reflux condenser. The mixture was refluxed and stirred for 15 hours. At the end of this time, a solid had separated from the reaction mixture. The yield was 38 parts of product melting at 176°–178° C. This is 85% of the theoretical yield. Recrystallization from 200 parts of the monomethyl ether of ethylene glycol gave thirty parts of product melting at 177°–181° C. The product was ethylene di-ethylvanillin ether.

*Example 15.—Ethylene-bis-(2-ethoxy-4-hydroxy-methylphenyl) ether*

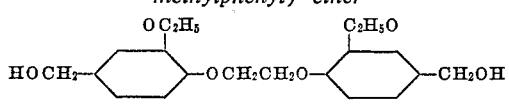

A mixture of 25 parts of ethylene di-ethylvanillin ether, 365 parts of methyl isobutyl carbinol and 9.5 parts of aluminum isopropoxide was placed in the apparatus described in Example 5 and the distillation was carried out as described there until all the methyl isobutyl ketone that was formed had been removed. The excess methyl isobutyl carbinol was removed by steam distillation. The residue was crystallized from water. The product melted at 117°–118° C.

*Example 16.—Condensation of ethylene-bis-(2-ethoxy-4-hydroxymethylphenyl) ether*

Two parts of ethylene-bis-(2-ethoxy-4-hydroxymethylphenyl) ether was dissolved in 170 parts of hot water containing 1.3 parts of hydrochloric acid. The mixture was refluxed and it became cloudy at once. After 2¾ hours of refluxing a resin had separated and was removed. This resin softened at 50° C. It was ground to a powder and molded in a press at 200° C. and a pressure of 6000 lbs. per sq. in. A tough disk of light color was obtained. It did not melt at 300° C.

The products of this invention are useful for the formation of films and molded objects. They are particularly useful where the products must withstand high temperatures or acid conditions.

We claim:
1. The compounds represented by the formula

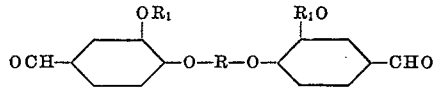

wherein R represents one of the divalent aliphatic groups consisting of —$CH_2CH_2$—, —$CH_2$—$CH_2$—$CH_2$—, —$CH_2$—$CH_2$—$CH_2$—$CH_2$— and

—$CH_2$—$CH_2$—O—$CH_2$—$CH_2$— and $R_1$ represents a radical of the group consisting of methyl and ethyl.

2. The compounds represented by the formula

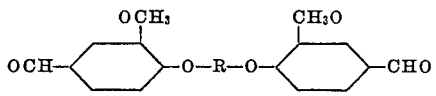

in which R represents one of the divalent aliphatic groups consisting of —$CH_2CH_2$—, —$CH_2$—$CH_2$—$CH_2$—, $CH_2$—$CH_2$—$CH_2$—$CH_2$— and

—$CH_2$—$CH_2$—O—$CH_2$—$CH_2$—.

No references cited.